United States Patent [19]

Chalilpoyil et al.

[11] Patent Number: 5,401,590
[45] Date of Patent: Mar. 28, 1995

[54] ADDITIVES FOR ELECTROCHEMICAL CELLS HAVING ZINC ANODES

[75] Inventors: Purush Chalilpoyil, Lincoln; Henry S. Padula, Milford; Peter B. Harris, Stow, all of Mass.; Ron Bing-Wo, Mississauga; Greg Brual, Brampton, both of Canada; Fred Kasianowicz, Pembroke, Mass.

[73] Assignee: Duracell Inc., Bethel, Conn.

[21] Appl. No.: 986,233

[22] Filed: Dec. 7, 1992

[51] Int. Cl.⁶ ............................................. H01M 6/14
[52] U.S. Cl. ........................................ 429/59; 429/212
[58] Field of Search ................. 429/57, 185, 190, 229, 429/230, 231, 59, 212

[56] References Cited

U.S. PATENT DOCUMENTS

| | | |
|---|---|---|
| 3,057,944 | 10/1962 | Ruetschi . |
| 3,847,669 | 11/1974 | Paterniti . |
| 4,195,120 | 3/1980 | Rossler . |
| 4,230,549 | 10/1980 | D'Agostino . |
| 4,298,506 | 11/1981 | Przybyla et al. ............... 429/219 |
| 4,455,358 | 6/1984 | Graham . |
| 4,606,984 | 8/1986 | Vignaud . |
| 4,777,100 | 10/1988 | Chalilpoyil et al. ............... 429/59 |
| 4,939,048 | 7/1990 | Vignaud . |
| 4,942,101 | 7/1990 | Audebert . |
| 5,128,222 | 7/1992 | Yoshizawa et al. ............... 429/190 |

FOREIGN PATENT DOCUMENTS 1154081 9/1983 Canada .
0474382A1 3/1992 European Pat. Off. .

*Primary Examiner*—José G. Dees
*Assistant Examiner*—Samuel Barts
*Attorney, Agent, or Firm*—Ronald S. Cornell; Barry D. Josephs

[57] ABSTRACT

The invention relates to a method for inhibiting the occurrence of load voltage instability in zinc anodic alkaline cells. The anode active material contains a gelled slurry of zinc alloy particles, a gelling agent, an aqueous alkaline solution and a mixed surfactant containing an anionic surfactant and a non-ionic surfactant. The gelled anode active material inhibits the occurrence of load voltage instability and simultaneously reduces hydrogen evolution even though the cell contains no added amounts of mercury.

19 Claims, 1 Drawing Sheet

ADDITIVES FOR ELECTROCHEMICAL CELLS HAVING ZINC ANODES

The invention relates to alkaline electrochemical cells with zinc anodes and additives, particularly containing mixtures of anionic and non-ionic surface active agents, which improve performance of such cells by inhibiting the occurrence of load voltage instability and retarding hydrogen formation.

Electrochemical cells, such as alkaline cells, typically contain zinc anode active material, alkaline electrolyte, a manganese dioxide cathode active material, and a permeable separator film, typically of cellulose or synthetic material. The anode active material has in the past contained as much as 10% by weight mercury in the form of amalgamated zinc particles. The mercury improves conductivity between the zinc particles and reduces the amount of hydrogen gas produced in the cell. The anode active material is typically formed into a gelled slurry using conventional gelling agents, such as carboxy-methylcellulose. The gelled slurry holds the zinc particles in place and in contact with each other. A conductive metal pin or nail known as the anode collector, is typically inserted into the anode active material. The cathode is typically of manganese dioxide and may include small amounts of carbon or graphite to increase conductivity. The alkaline electrolyte is typically an aqueous solution of potassium hydroxide, but other alkali solutions such as aqueous solutions of sodium or lithium hydroxide may also be employed. Conventional alkaline cells are encased in a steel container to retain the cell components and reduce the chance of leakage.

Because of environmental concerns and regulations, manufacturers of alkaline cells have been trying to reduce the content of mercury to under 1% by weight of the anode active material and more recently to less than 50 parts mercury per million parts (ppm) by total cell weight. This requires that a substitute for mercury be found which can prove at least as effective in inhibiting the formation of hydrogen gas during cell discharge. (During discharge hydrogen gas forms as the water contained in the electrolyte solution contacts and reacts with zinc. The evolution of hydrogen gas can cause leakage of the cell's components or otherwise interfere with the cell's performance.)

Problems in addition to increased gassing can occur when mercury content is significantly reduced. One such problem is a phenomenon known as load voltage instability (LVI). LVI can occur during normal use of the cell when the mercury content in the cell is less than about 50 parts per million parts by total weight of the cell. This phenomenon can occur periodically when the cell is tapped, bumped or otherwise jolted during normal discharge. Under such conditions a sudden drop in voltage as high as several hundred millivolts can occur. The drop in voltage is typically transitory lasting for a fraction of a second, but occasionally can last for several seconds. The drop in voltage, albeit transitory, can cause the device being powered to noticeably malfunction. It is not known with certainty why this phenomenon occurs. It is conjectured that the physical jolt may momentarily diminish contact between enough of the zinc particles to cause a temporary break in conduction of electrons from the zinc particles to the anode collector. Generally, environmentally safe substitutes to completely replace mercury in alkaline cells, without sacrifice in cell performance, have been difficult to find.

U.S. Pat. Nos. 4,939,048 and 4,942,101 are directed to inhibiting the occurrence of load voltage instability in a mercury free alkaline cell containing a gelled zinc anode. U.S. Pat. No. 4,939,048 discloses use of an anode current collector comprising a bundle of conductive fibers and U.S. Pat. No. 4,942,101 discloses use of an anode current collector of various configurations with fittings thereon designed to increase its surface area. Both references disclose use including from 1 to 1000 ppm of an organic stabilization compound selected from polyfluoride compounds of the ethoxyl fluoroalcohol type and compounds of the polyethoxylalcohol and alcoyl sulfide type. There is no disclosure or suggestion of mixing anionic and nonanionic surface active agents or that any particular benefits can be obtained from such mixing.

The following prior art discloses a number of organic compounds that reduce the formation of hydrogen gas in alkaline cells. The use of these materials has allowed for a reduction of mercury content to environmentally safe levels. However, none of these materials has been disclosed to have an effect on load voltage instability.

U.S. Pat. No. 4,2195,120 discloses the addition of an organic phosphate ester surfactant to the anode, cathode or electrolyte of an alkaline cell having zinc anodes containing mercury. Examples of such surfactants are disclosed as available under the trade designation GAFAC RE610, GAFAC RA600, and KLEARFAC AA-040. The addition of the phosphate ester surfactant reduces the hydrogen evolution, thereby increasing the shelf-life and useful discharge life of the cell.

U.S. Pat. No. 4,455 358 discloses the use of a starch-graft copolymer as gelling agent for the zinc anode comprising an amalgamated zinc powder containing about 7% mercury. The gelling agent is composed of a carbohydrate backbone which has a water soluble side chain grafted onto it. The gelling agent is reported to increase the practical discharge capacity of the anode while reducing the amount of hydrogen evolution from the cell.

Canadian Patent 1,154,081 discloses the use of a gelling composition formed preferably of a mixed gelling agent containing a starch-graft copolymer and yet another gelling agent, for example, carboxymethylcellulose. The mixed gelling agent is used to gel conventional amalgamated zinc powder for Zn-alkaline-$MnO_2$ cells. The mixed gelling agent is reported to inhibit internal shorting of the cell, which can occur if carboxymethylcellulose alone is employed.

U.S. Pat. No. 3,057,944 discloses the addition of a surface active agent which is heteropolar substance admixed either into the electrolyte or the silver cathode of an electrochemical cell.

U.S. Pat. No. 3,847,669 discloses the addition of an ethylene oxide polymer to a zinc-manganese dioxide cell. The ethylene oxide polymer may be used to wet the separator or may be added to the zinc during preparation of the zinc anode gel. The ethylene oxide polymer is reported as allowing for a reduction in the amount of mercury required to be added to the zinc anode.

U.S. Pat. No. 4,230,549 discloses a novel polymer membrane to be used as separator membrane in electrochemical cells. The membrane is preferably composed of a cross-linked low density polyethylene base grafted with methacrylic acid. Before use, the polymer membrane is immersed in a solution containing surfactants which may be a mixture of an anionic and non-ionic emulsifier such as Ultrawet KX (a sodium linear alkyl sulfonate) and Triton X100 (isooctyl phenoxyl polyethoxy ethanol). The treatment of the membrane with the surfactants is reported to have the effect of lowering the electrolytic resistance of the membrane as well as imparting to it better wetting characteristics. There is no discussion with respect to load voltage instability or the effect of these surfactants on hydrogen evolution.

European Patent Publication 0 474 382 A1 relates to an alkaline cell having a zinc containing anode and is substantially mercury free, i.e. the mercury content is less than 50 parts per million per total cell weight. This reference discloses additives that inhibit the corrosion of zinc. One such additive is an ethylene oxide polymer, such as phosphate esters of ethylene oxide polymers, perfluorinated organic compounds of the ethoxylated fluoroalcohol type, and alkyl and polyethoxyalcohol sulphides. The preferred ethylene oxide polymers are the polyethylene glycols and methoxy polyethylene glycols having a molecular weight from about 300 to 700. (p. 5, line 27–42.) It is stated in broad brush that the ethylene oxide polymers can be used singly or in combination. (p. 5, line 42.) There is no disclosure or suggestion of any particular benefit accruing to the use of any particular type of ethylene oxide polymers in combination. The anode mixture contains electrolyte and optionally an electrolyte-swellable binder such as a polyacrylic acid, for example, Carbopol 940 gelling agent. (p. 4, line 35.) The cells are reported to exhibit insufficient bulge due to hydrogen gas formation to cause leakage of the cell components. (p.7, lines 13–17.) There is no discussion or recognition in this reference of the problem of load voltage instability occurring in alkaline cells which contain zero added mercury. There are also no specific examples which include more than one ethoxylated polymer and in fact all the specific examples read on only one ethylene oxide polymer, namely a methoxylated polyethylene oxide (CARBOWAX 550).

U.S. Pat. No. 4,606,984 discloses the addition of a fluorinated organic compound of the ethoxylated fluoroalcohol type to an anode of a primary electrochemical cell containing zinc, aluminum or magnesium. A preferred compound of this type is disclosed as available under the trade designation FORAFAC 1110. The fluorinated compound when added to the anodic material in percentage between 0.01% and 1% by weight of the metal therein, acts as inhibitor causing a reduction in hydrogen gas evolution from the cell. The hydrogen evolution rate is reported at various levels of mercury content in the cell, i.e., from 0% to 5% mercury content with respect to zinc in a zinc anodic alkaline cell. When the fluorinated compound was added to zinc anodic material, the rate of hydrogen evolution decreased at all levels of mercury content compared to the same anodic material with no inhibitor.

Accordingly it is desirable to find an environmentally safe, disposable substitute for mercury in electrochemical cells, particularly in zinc anodic alkaline cells, that both inhibits hydrogen gas formation and load voltage instability.

It is desirable to find an additive for cells that inhibit the occurrence of load voltage instability during normal discharge of the cell, particularly in zinc anodic alkaline cells having a mercury content of less than about 50 parts per million parts by total weight of the cell.

It is desirable to find additives for cells that simultaneously retard or inhibit hydrogen evolution, particularly in zinc anodic alkaline cells having a mercury content of less than about 50 parts mercury per million parts by total weight of the cell.

The following Figures show representative comparative discharges graphs illustrative of the performance of the invention.

Figure 1:
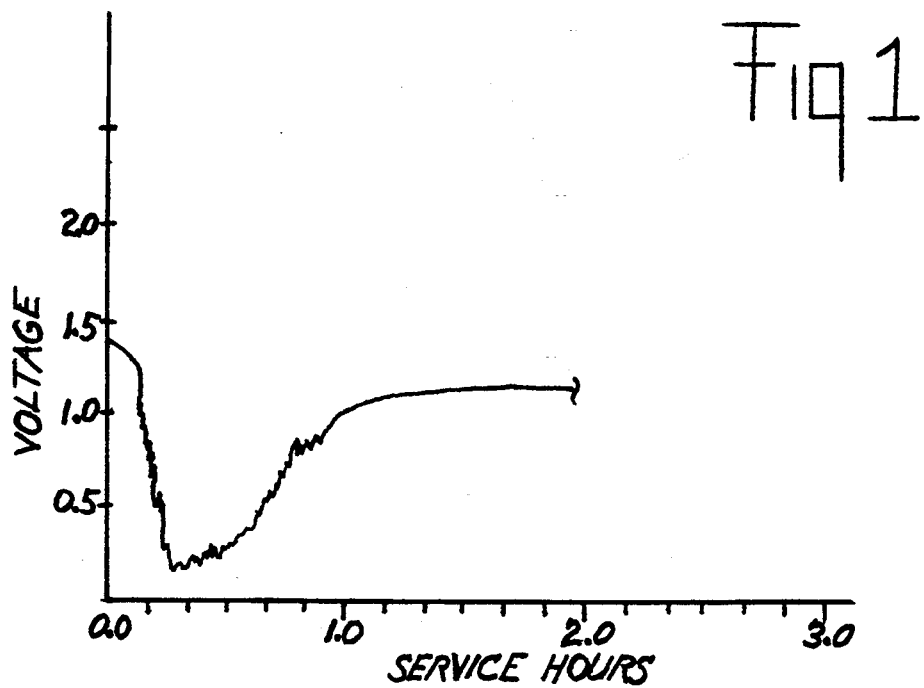
FIG. 1 is a graphical plot of the voltage discharge profile (voltage versus service hour) of the alkaline cell described in Example 5 as the cell was tapped at regular one minute intervals as it was discharged under a load of 3.9 ohms.

It has been discovered that the addition of a mixture of an anionic and a non-ionic surfactant to the cell, preferably to the zinc anode, inhibits the occurrence of load voltage instability even when there is no mercury added to the cell, e.g., when the mercury content in the cell is below about 50 parts and even less than 10 parts per million parts by total weight of the cell. It is surprising that the problem of load voltage instability in such cells can be overcome simply by adding a mixture of surfactants, since the surfactants themselves are not electrically conductive. It is unexpected that the mixture of anionic and non-ionic surfactants have a combined effect in both inhibiting load voltage instability and simultaneously reducing gassing than either class of surfactants alone. Also, it has been determined that the mixture of surfactants in such cells give cell performance, e.g. in terms of discharge voltage profile and service hours, similar to that obtained in conventional alkaline cells of same composition, but containing an added amount of mercury and no surfactants. In fact for most applications the performance between the two cells is virtually indistinguishable.

The mixture of an anionic surfactant and a non-ionic surfactant have been determined to also significantly reduce the amount of hydrogen gas produced in the cell. Conventional gelling agents alone have some effect in reducing hydrogen evolution. However, it has been determined that the addition of the surfactants to the zinc slurry along with the gelling agent greatly reduces the amount of hydrogen evolution, particularly in alkaline cells that contain no added amounts of mercury, for example, less than 50 parts mercury per million parts by weight of the cell. The resultant effect is that when a mixture of anionic and non-ionic surfactants is added to the zinc slurry, the occurrence of load voltage instability is inhibited and hydrogen evolution from the cell is reduced to a level that does not noticeably interfere with the cell's performance or shelf-life, even though the cell contains no added mercury and less than 50 parts mercury per million parts cell weight.

It should be understood that residual amounts of mercury may be present in commercially available pure zinc or in any of the other cell components. (Commercially pure zinc typically has less than 100 parts mercury per billion parts zinc.) The term "substantially mercury free" is defined herein as a mercury content of less than about 50 parts mercury per million parts total cell weight. The term "essentially mercury free" shall be defined herein as a mercury content less than about 10 parts mercury per million parts by total weight of the cell. Both "substantially mercury free" and "essentially mercury free" cells fall within the definition of "zero-added mercury" cells. "Zero-added mercury" cells contain no added amounts of mercury. Such cells are defined as containing only the residual amount of mercury present in commercially available pure zinc, including the residual amount of mercury, if any, present in the other cell components.

The surfactant mixture of the invention to be added to zinc anode active material for alkaline cells is comprised of at least one anionic surfactant and at least one non-ionic surfactant. The anionic and non-ionic surfactants each have a polyethoxy chain $-(CH_2-CH_2-O)_n-$ which typically forms the hydrophilic portion of the molecule. The anionic surfactant can be represented generally by the formula (A),

$$R^1(CH_2-CH_2-O)_n-X^1 \qquad (A)$$

where $R^1$ represents alkyl, aryl, alkylaryl (including substituted alkyl or aryl groups) and these groups normally form the hydrophobic portion of the molecule. The group $R^1$ is typically an alkyl chain composed of 4 to 28 carbon atoms. The average number of ethoxy groups, n, is typically between 3 and 40. The molecule terminates at the other end with the anionic group, $X^1$. The anionic group, X, may typically be selected from acid or salt moieties such as those derived from phosphoric acid moieties ($-O-PO_3H_2$), boric acid moeities ($-O-BO_2H_2$), carboxylic moieties ($-COOH$) and salts thereof. The anionic surfactant may also be selected from polyethoxy phosphate esters of the type described in U.S. Pat. No. 4,195,120, herein incorporated by reference. The anionic surfactants represented by the formula (A) may be selected in their entirety from the organic phosphate esters of the type described in U.S. Pat. No. 4,195,120. The anionic surfactant may typically have a molecular weight of between 200 and 2000.

A preferred anionic surfactant for use in the present invention is available under the trade designation GAFAC RA600 organic phosphate ester surfactant from Rhone Poulenc.

The non-ionic surfactant can be represented generally by the formula (B), $$R^2-(CH_2-CH_2-O)_n-X^2 \qquad (B)$$

where $R^2$ represents hydrogen, alkyl, aryl, alkylaryl (including substituted alkyl or aryl groups), fluorinated aliphatic groups (including substituted fluorinated aliphatic groups), fluorinated aliphatic groups containing amino groups, e.g. sufonamido groups, and any combinations thereof. The group, $R^2$, normally forms the hydrophobic portion of the molecule. The group, $R^2$, typically contains between about 3 and 16 carbon atoms when fluorinated and between 4 and 28 carbons when not fluorinated. The average number of ethoxy groups, n, typically is between 3 and 250. The molecule terminates with the non-ionic group, $X^2$, which may typically be hydrogen or methyl The non-ionic surfactant may typically have a molecular weight of between about 200 and 10000.

Preferred non-ionic surfactants for use in the present invention is TRITON X100 (isooctyl phenoxyl polyethoxy ethanol) from Rohm and Haas Co., ZONYL FSN and ZONYL FSO (both of which are fluorinated aliphatic polyethoxy ethanols) from E.I. DuPont and FLUORAD FC-170C (a fluorinated alkyl polyethoxy ethanol) from 3M Company. TRITON X100 surfactant

has the formula $C_8H_{17}C_6H_4(OC_2H_4)_{10}OH$. ZONYL FSN and ZONYL FSO surfactants have the general formula $R_fCH_2CH_2O(CH_2CH_2O)_xH$, where $R_f=F(CF_2CF_2)_z$ and z=3 to 8. FLUORAD FC-170C surfactant has the general formula $R_fSO_2N(C_2H_5)(CH_2CH_2O)_xH$ where $R_f=C_nF_{2n+1}$ and n has an average value of about 8.

The preferred anode active material is composed of a gelled zinc slurry containing a mixture of at least one anionic surfactant and one non-ionic surfactant, advantageously from the preferred surfactants above described, typically in amounts comprising between about 25 and 200 ppm of each, preferably about 75 ppm of each as compared to the amount of zinc alloy in the slurry.

The gelling agents for the zinc slurry can be selected from a variety of known gelling agents activated by alkaline mixtures. Preferred gelling agents are substantially insoluble in the cell electrolyte so that the gelling agent does not migrate between the anode and cathode. The preferred gelling agents also do not lose water when the gelled zinc slurry is left in storage. Suitable gelling agents, for example, are carboxymethyl cellulose or crosslinked carboxymethyl cellulose, methyl cellulose, Xanthan gum, crosslinked polyacrylamides, crosslinked acrylic acid copolymers such as CARBOPOL C-940 from B.F. Goodrich Co., starch graft copolymers such as WATER-LOCK A-221 starch-graft copolymer of polyacrylic acid and polyacrylamide from Grain Processing Co., and alkali hydrolyzed polyacrylonitrile such as WATER-LOCK A 400 from Grain Processing Co. The gelling agent can be used alone or in mixture with other known gelling or thickening components. Although any of these gelling agents can be employed alone or in combination, at least one of the gelling agents may advantageously be selected from crosslinked acrylic acid polymer such as CARBOPOL C940 or SIGMA POLYGEL 4P gelling agents or a starch graft copolymer such as WATER-LOCK A-221 copolymer.

A zinc slurry is prepared by mixing a zinc alloy powder (e.g. 99.9% zinc alloy powder containing about 500 ppm indium) with a suitable gelling agent using a blender or other similar mixing equipment. (The zinc powder may typically contain between about 50 and 1000 parts indium per million parts by weight of the particles.) Suitable gelling agents are then added to the blender. The gelling agents may advantageously be selected from the list above described. The zinc powder and gelling agent are then blended until a homogeneous mixture is obtained. The electrolyte solution, typically an aqueous solution of KOH (40 wt % KOH, 2 wt % ZnO, remainder $H_2O$) and the surfactants are then added to the mix while blending. (Alternatively, the surfactants may be added directly to the zinc powder before blending the zinc powder with the gelling agent.) The mixture is then transferred to a closed storage tank. The gelled zinc slurries having the various compositions set forth in the ensuing examples are prepared in accordance with the above described procedure.

The following examples illustrate the invention and advantages derived therefrom. (All compositions are by weight unless otherwise specified.)

Example 1 (Comparative Example)

A conventional zinc/manganese dioxide alkaline size AA-cell is prepared with conventional cathode active material, electrolyte and separator membrane. The cell contains zero-added mercury and is "essentially mercury free" (containing less than 10 parts mercury per million parts total cell weight). The cathode active material in the cell is composed of electrolytic manganese dioxide (86 wt %), graphite (8 wt %) and a 7 Normal aqueous solution of KOH (6 wt %). The separator membrane is a conventional electrolyte permeable membrane containing polyvinyl alcohol/rayon material. The electrolyte is an aqueous solution of KOH containing about 40 wt % KOH and 2 wt % ZnO, hereinafter referred to as "aqueous 40 wt % KOH solution". The anode active material is a zinc slurry without any surfactants and having the following composition:

Zinc alloy powder (99.9 wt % zinc alloy containing 500 ppm indium) (64.6 wt %); aqueous 40 wt % KOH solution (34.7 wt %); CARBOPOL C940 gelling agent (0.4 wt %); and WATER-LOCK A-221 gelling agent (0.3 wt %).

The cell in this example produces a nominal voltage of about 1.5 volts and is discharged under a 3.9 ohm load. The cell is tapped or jolted with an impact force of about 60 pounds (267 Newtons) at regular one minute intervals over the cell discharge life. A voltage drop usually between about 250 and 750 millivolts (average about 500 millivolts) typically occurs upon impact giving a discharge curve similar to the one shown in FIG. 1.

The cell in this example evolves 2.6 milliliters of hydrogen at 71° C. over a period of 4 weeks before discharge. (Holding cells at 71° C. (160° F.) for a period of one week is generally regarded as equivalent to one year of shelf-life of such cells at room temperature.) This volume of hydrogen gas evolution is considered to be unacceptably high.

Example 2

The same AA alkaline cell as in Example 1 is prepared "essentially mercury free" but with an anionic surfactant included in the zinc anode active material. The zinc anode active material is a zinc slurry having the following composition:

Zinc alloy powder (99.9 wt % zinc alloy containing 500 ppm indium) (64.5 wt %); aqueous 40 wt % KOH solution (34.6 wt %); CARBOPOL C940 gelling agent (0.4 wt %); WATER-LOCK A-221 gelling agent (0.3 wt %); aqueous surfactant[1] solution containing GAFAC RA600 anionic surfactant (0.2 wt %).

[1] The aqueous surfactant solution contains about 150 ppm by weight GAFAC RA600 anionic surfactant with respect to the zinc alloy and thus the aqueous solution contains about 6 wt % GAFAC RA600 surfactant and 94 wt % H$_2$O.

The cell in this example produces a nominal voltage of about 1.5 volts and is discharged under a 3.9 ohm load. The cell is tapped or jolted with an impact force of about 60 pounds (267 Newtons) at regular one minute intervals over the cell discharge life. A voltage drop typically between about 250 and 750 millivolts (average about 500 millivolts) occurs upon impact giving a discharge curve similar to the one shown in FIG. 1.

The cell in this example evolves about 0.9 milliliters of hydrogen at 71° C. over a period of 4 weeks before discharge. This gassing level is acceptable, but the load voltage instability described above is not.

Example 3

The same AA alkaline cell as in Example 1 is prepared but with an anionic and non-ionic surfactant included in the anode active material. The anode active material is a zinc slurry having the following composition:

Zinc alloy powder (99.9 wt % zinc alloy containing 500 ppm indium) (64.5 wt %); aqueous 40 wt % KOH solution (34.6 wt %); CARBOPOL C940 gelling agent (0.4 wt %); WATER-LOCK A-221 gelling agent (0.3 wt %); aqueous surfactant[1] solution containing GAFAC RA600 anionic surfactant and TRITON X100 non-ionic surfactant (0.2 wt %).

[1] The aqueous surfactant solution contains about 75 ppm by weight GAFAC RA600 anionic surfactant and 75 ppm by weight TRITON X100 non-ionic surfactant with respect to the zinc alloy. Thus, the aqueous surfactant solution contains about 3 wt % GAFAC RA600 surfactant, 3 wt % TRITON X100 surfactant and 94 wt % H$_2$O.

The cell in this example produces a nominal voltage of about 1.5 volts and is discharged using a 3.9 ohm load. The cell is tapped and jolted with an impact force of about 60 pounds (267 Newtons) at regular one minute intervals during the cell discharge life. There are no detectable load voltage instabilities over the discharge life of the cell. The discharge curve is similar to the one shown in FIG. 2.

The cell in this example evolves 1.2 milliliters of hydrogen at 71° C. over a period of 4 weeks before discharge. This is an acceptable level of hydrogen gas evolution.

The performance of the cell of this example in terms of its discharge voltage profile and service life is similar to conventional Zn/MnO2 alkaline cells of same composition, but containing added amounts of mercury and no surfactants.

Example 4

The same AA alkaline cell as in Example 1 is prepared but with a non-ionic surfactant included in the zinc anode active material. The zinc anode active material is a zinc slurry having the following composition:

Zinc alloy powder (99.9 wt % zinc alloy containing 500 ppm indium) (64.5 wt %); aqueous 40 wt % KOH solution (34.6 wt %); CARBOPOL C940 gelling agent (0.4 wt %); WATER-LOCK A-221 gelling agent (0.3 wt %); aqueous surfactant[1] solution containing TRITON X100 non-ionic surfactant (0.2 wt %).

[1] The aqueous surfactant solution contains about 150 ppm by weight TRITON X100 non-ionic surfactant with respect to the zinc alloy and thus the aqueous solution contains about 6 wt % TRITON X100 surfactant and 94 wt % H$_2$O.

The cell in this example produces a nominal voltage of about 1.5 volts and is discharged under a 3.9 ohm load. The cell is tapped or jolted with an impact force of about 60 pounds (267 Newtons) at regular one minute intervals over the cell discharge life. There are no detectable load voltage instabilities over the discharge life of the cell. Although there are no load voltage instabilities, the service hours of the cell in this example is 10 percent less than the cell in Example 3 if the discharge service of both cells are carried out at 0° C. This performance loss is unacceptably high.

The cell in this example evolves about 1.2 milliliters of hydrogen at 71° C. over a period of 4 weeks before discharge.

Example 5 (Comparative Example)

The same conventional AA alkaline cell as in Example 1 is prepared "essentially mercury free" except that the anode active material is composed of a gelled zinc slurry without surfactants and has the following composition:

Zinc alloy powder (99.9 wt % zinc alloy containing 500 ppm indium) (64.5 wt %); aqueous 40 wt % KOH solution (34.7 wt %); and SIGMA POLYGEL 4P gelling agent (0.8 wt %).

The cell in the above example produces a nominal voltage of about 1.5 volts and is discharged under a 3.9 ohm load. The cell is tapped or jolted with an impact force of about 60 pounds (267 Newtons) at regular one minute intervals over the cell discharge life. An average voltage drop of about 700 millivolts occurs upon impact. A representative profile (voltage versus service hours) as the cell is tapped at regular one minute intervals during discharge is shown in FIG. 1.

The hydrogen gas evolution from the cell in this and the three following examples is determined by performing the following out of cell gassing test. A quantity of 1) the zinc anode composition specified in each example, 2) electrolyte, and 3) anode collector material are sealed in a container in about the same proportion that they are present in an actual cell. The container is stored at 71° C. for four weeks. Thereafter, the amount of hydrogen gas contained in the head space is analyzed and adjusted by proration to take into account the difference between the absolute quantity of materials in the test versus the amount in the actual cell. The gas amounts reported here are the adjusted amounts.

The AA alkaline cell gas evolution (assuming storage of the cell for 4 weeks at 71° C. and atmospheric pressure) is determined to be 3.6 milliliters at these conditions. This amount of hydrogen gas evolution is considered to be unacceptably high.

Example 6

The same conventional AA alkaline cell as in Example 1 is prepared except that the anode active material in the cell is composed of a gelled zinc slurry having the following composition:

Zinc alloy powder (99.9 wt % zinc alloy containing 500 ppm indium) (64.5 wt %); aqueous 40 wt % KOH solution (34.5 wt %); SIGMA POLYGEL 4P gelling agent (0.8 wt %); aqueous surfactant solution[1] containing GAFAC RA600 anionic surfactant and ZONYL FSN non-ionic surfactant (0.2 wt %).

[1] The aqueous surfactant solution contains about 75 ppm by weight GAFAC RA600 anionic surfactant and 75 ppm by weight ZONYL FSN non-ionic surfactant with respect to the zinc alloy. Thus, the aqueous surfactant solution contains about 3 wt % GAFAC RA600 surfactant, 3 wt % ZONYL FSN surfactant and 94 wt % $H_2O$.

The cell in the above example produces a nominal voltage of about 1.5 volts and is discharged under a 3.9 ohm load. The cell is tapped or jolted with an impact force of about 60 pounds (267 Newtons) at regular one minute intervals over the cell discharge life. There is no detectable load voltage instability over the discharge life of the cell. The discharge curve is similar to the one shown in FIG. 2.

The performance of the cell of this example in terms of its discharge voltage profile and service life is similar to a conventional Zn/MnO2 alkaline cells of same composition, but containing added amounts of mercury and no surfactants.

The rate of hydrogen gas produced in an AA alkaline cell containing the above gelled zinc slurry composition is determined in the same manner as set forth in Example 5. The AA alkaline cell gas evolution (assuming storage of the cell for 4 weeks at 71° C. and atmospheric pressure) is determined to be 0.9 milliliters at these conditions, which is an acceptable level of hydrogen gas formation.

Example 7

The same conventional AA alkaline cell as in Example 1 is prepared except that the anode active material in the cell is composed of a gelled zinc slurry having the following composition:

Zinc alloy powder (99.9 wt % zinc alloy containing 500 ppm indium) (64.5 wt %); aqueous 40 wt % KOH solution (34.5 wt %); SIGMA POLYGEL 4P gelling agent (0.8 wt %); aqueous surfactant solution[1] containing GAFAC RA600 anionic surfactant and ZONYL FSO non-ionic surfactant (0.2 wt %).

[1] The aqueous surfactant solution contains about 75 ppm by weight GAFAC RA600 anionic surfactant and 75 ppm by weight ZONYL FSO non-ionic surfactant with respect to the zinc alloy. Thus, the aqueous surfactant solution contains about 3 wt % GAFAC RA600 surfactant, 3 wt % ZONYL FSO surfactant and 94 wt % $H_2O$.

The cell in the above example produces a nominal voltage of about 1.5 volts and is discharged under a 3.9 ohm load. The cell is tapped or jolted with an impact force of about 60 pounds (267 Newtons) at regular one minute intervals over the cell discharge life. There is no detectable load voltage instability over the discharge life of the cell. The discharge curve is similar to the one shown in FIG. 2.

The performance of the cell of this example in terms of its discharge voltage profile and service life is similar to conventional Zn/MnO2 alkaline cells of same composition, but containing added amounts of mercury and no surfactants.

The rate of hydrogen gas produced in an AA alkaline cell containing the above gelled zinc slurry composition is determined in the same manner as set forth in Example 5. The AA alkaline cell gas evolution (assuming storage of the cell for 4 weeks at 71° C. and atmospheric pressure) is determined to be 0.8 milliliters at these conditions, which is an acceptable level of hydrogen gas formation.

Example 8

The same conventional AA alkaline cell as in Example 1 is prepared except that the anode active material in the cell is composed of a zinc slurry having the following composition:

Zinc alloy powder (99.9 wt % zinc alloy containing 500 ppm indium) (64.5 wt %); aqueous 40 wt % KOH solution (34.5 wt %); SIGMA POLYGEL 4P gelling agent (0.8 wt %); aqueous surfactant solution[1] containing GAFAC RA600 anionic surfactant and FC-170C non-ionic surfactant (0.2 wt %).

[1] The aqueous surfactant solution contains about 75 ppm by weight GAFAC RA600 anionic surfactant and 75 ppm by weight FC-170C non-ionic surfactant with respect to the zinc alloy. Thus, the aqueous solution contains about 3 wt % GAFAC RA600 surfactant, 3 wt % FC-170C surfactant and 94 wt % $H_2O$.

Figure 2:
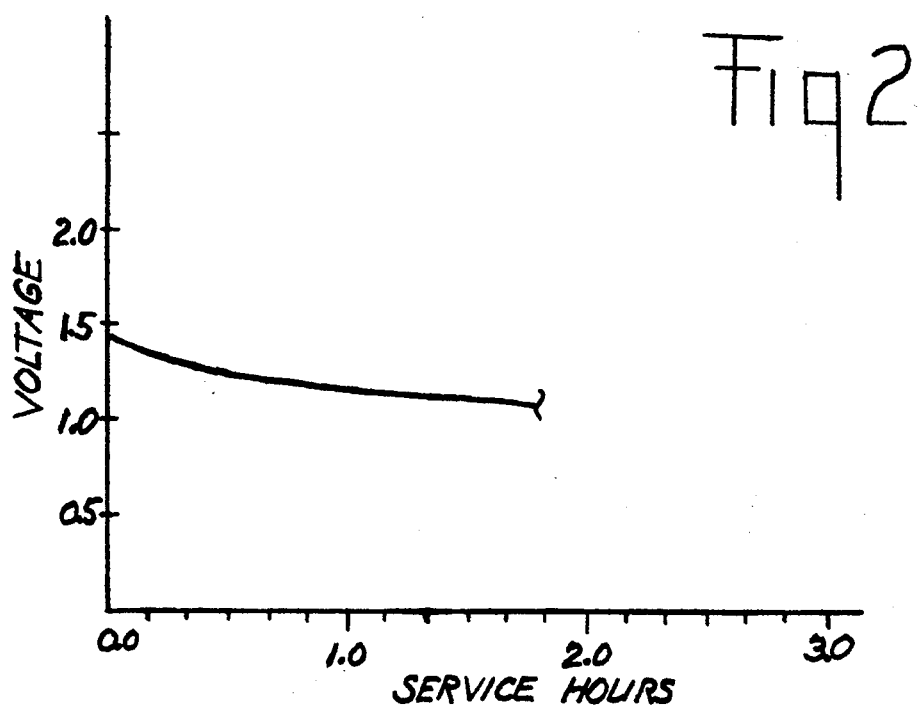
FIG. 2 is a graphical plot of the voltage discharge profile (voltage versus service hour) of the alkaline cell described in Example 8 as the cell was tapped at regular one minute intervals as it was discharged under a load of 3.9 ohms.

The cell in the above example produces a nominal voltage of about 1.5 volts and is discharged under a 3.9 ohm load. The cell is tapped or jolted with an impact force of about 60 pounds at regular one minute intervals over the cell discharge life. There is no detectable load voltage instability over the discharge life of the cell. A representative profile (voltage versus service hours) as the cell is tapped during discharge is shown in FIG. 2.

The performance of the cell of this example in terms of its discharge voltage profile and service life is similar to conventional Zn/MnO2 alkaline cells of same composition, but containing added amounts of mercury and no surfactants.

The rate of hydrogen gas produced in an AA alkaline cell containing the above gelled zinc slurry composition is determined in the same manner as set forth in Example 5. The AA alkaline cell gas evolution (assuming storage of the cell for 4 weeks at 71° C. and atmospheric pressure) is determined to be 0.8 milliliters at these conditions, which is an acceptable level of hydrogen gas formation.

Although the present invention is described with respect to specific embodiments, it should be appreciated that other embodiments falling within the scope and the concept of the invention are also possible. Therefore, the invention is not intended to be limited by the specific embodiments, but rather is defined by the claims and equivalents thereof.

What is claimed is:

1. A method for both inhibiting the occurrence of load voltage instability and controlling the formation of hydrogen gas in an alkaline electrochemical cell containing less than 50 pans of mercury per million parts by weight of the cell and having a gelled zinc anode and an aqueous alkaline electrolyte, said method comprising adding a mixture of at least one anionic surfactant and one non-ionic surfactant to said zinc anode.

2. The method of claim 1 wherein the cell has a cathode active material therein comprising manganese dioxide and the aqueous alkaline solution comprises potassium hydroxide.

3. The method of claim 1 wherein the anionic surfactant is represented by the formula:

$$R^1(CH_2-CH_2-O)_n-X^1$$

wherein, $R^1$ is selected from the group consisting of alkyl, aryl alkylaryl and combinations thereof; $X^1$ is selected from an anionic group consisting of an anionic acid group, salt of an anionic acid group, and anionic phosphate ester group; and n is between about 3 and 40.

4. The method of claim 1 wherein the non-ionic surfactant is represented by the formula:

$$R^2-(CH_2-CH_2-O)_n-X^2$$

wherein, $R^2$ is selected from the group consisting of alkyl, aryl, alkylaryl, fluorinated aliphatic groups and combinations thereof; $X^2$ is a non-ionic group; and n is between about 3 and 250.

5. The method of claim 3 wherein the group $R^1$ is an an alkyl group containing between about 4 and 28 carbon atoms.

6. The method of claim 3 wherein the anionic surfactant has a molecular weight between about 200 and 2000.

7. The method of claim 4 wherein the group $R^2$ is a fluorinated aliphatic group having between about 3 and 16 carbon atoms.

8. The method of claim 4 wherein the non-ionic surfactant has a molecular weight between about 200 and 10000.

9. The method of claim 1 wherein the gelled anode active material comprises between about 25 and 200 parts anionic surfactant per million parts by weight of the zinc-alloy particles and between about 25 and 200 parts non-ionic surfactant per million parts by weight of the zinc-alloy particles.

10. The method of claim 1 wherein the cell contains less than 10 parts mercury per million parts by weight of the cell.

11. The method of claim 1 wherein the zinc alloy particles comprise an alloy comprising zinc and indium.

12. The method of claim 11 wherein said particles contain between about 50 and 1000 parts indium per million parts by weight of the particles.

13. The method of claim 1 wherein the gelling agent comprises a gelling component selected from the group consisting of crosslinked acrylic acid copolymers and starch graft copolymers, and mixtures thereof.

14. The method of claim 1 wherein the gelling agent comprises a mixture of CARBOPOL C940 crosslinked acrylic acid copolymer and WATER-LOCK A-221 starch graft copolymer.

15. The method of claim 13 wherein the gelling agent comprises SIGMA POLYGEL 4P (SYNTHALEN M) crosslinked acrylic acid polymer.

16. The method of claim 13 wherein the gelling agent comprises WATER-LOCK A-221 starch graft copolymer.

17. The method of claim 13 wherein the gelling agent comprises CARBOPOL C940 crosslinked acrylic acid copolymer.

18. A method for both inhibiting the occurrence of load voltage instability and controlling the formation of hydrogen gas in an alkaline electrochemical cell having a gelled zinc anode, an aqueous alkaline electrolyte, and "zero added" mercury, said method comprising adding a mixture of at least one anionic surfactant and one non-ionic surfactant to said zinc anode, wherein the anionic surfactant is represented by the formula:

$$R^1(CH_2-CH_2-O)_n-X^1$$

wherein, $R^1$ is selected from the group consisting of alkyl, aryl alkylaryl and combinations thereof; $X^1$ is selected from an anionic group consisting of an anionic acid group, salt of an anionic acid group, and anionic phosphate ester group; and n is between about 3 and 40, and wherein the non-ionic surfactant is represented by the formula:

$$R^2-(CH_2-CH_2-O)_n-X^2$$

wherein, $R^2$ is selected from the group consisting of alkyl, aryl, alkylaryl, fluorinated aliphatic groups and combinations thereof; $X^2$ is a non-ionic group; and n is between about 3 and 250.

19. The method of claim 18 wherein the cell contains less than 50 parts mercury per million parts by weight of the cell.

* * * * *